United States Patent
Bulinski et al.

(10) Patent No.: US 10,280,351 B2
(45) Date of Patent: May 7, 2019

(54) FLUORINATED OLEFINS AS WORKING FLUIDS AND METHODS OF USING SAME

(71) Applicant: 3M INNOVATIVE PROPERTIES COMPANY, St. Paul, MN (US)

(72) Inventors: Michael J. Bulinski, Stillwater, MN (US); Michael G. Costello, Afton, MN (US); John G. Owens, Woodbury, MN (US); Michael J. Rice, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/926,242

(22) Filed: Mar. 20, 2018

(65) Prior Publication Data

US 2018/0320040 A1    Nov. 8, 2018

Related U.S. Application Data

(63) Continuation of application No. 15/105,103, filed as application No. PCT/US2014/070766 on Dec. 17, 2014, now Pat. No. 9,957,428.

(Continued)

(51) Int. Cl.

| | |
|---|---|
| *C09K 5/04* | (2006.01) |
| *C08J 9/14* | (2006.01) |
| *C08J 9/00* | (2006.01) |
| *F28D 15/00* | (2006.01) |
| *A62D 1/00* | (2006.01) |

(Continued)

(52) U.S. Cl.
CPC ............ *C09K 5/045* (2013.01); *A62D 1/0057* (2013.01); *A62D 1/0071* (2013.01); *A62D 1/0092* (2013.01); *C08J 9/0028* (2013.01); *C08J 9/141* (2013.01); *F01K 25/08* (2013.01); (Continued)

(58) Field of Classification Search
None
See application file for complete search history.

(56) References Cited

U.S. PATENT DOCUMENTS

| | | |
|---|---|---|
| 2,713,593 A | 7/1955 | Brice |
| 4,205,138 A | 5/1980 | Muller |

(Continued)

FOREIGN PATENT DOCUMENTS

| | | |
|---|---|---|
| CA | 1088523 | 10/1980 |
| CA | 2291882 | 6/2001 |

(Continued)

OTHER PUBLICATIONS

Banks, Preparation, Properties and Industrial Applications of Organofluorine Compounds, 19-43 (1982).

(Continued)

*Primary Examiner* — Joseph D Anthony
(74) *Attorney, Agent, or Firm* — Adam Bramwell

(57) ABSTRACT

A working fluid that includes a fluorinated olefin compound represented by the following general formula (I):

$$\begin{array}{c}Rf_1\\ \phantom{Rf_1}\diagdown\\ \phantom{Rf_1xx}N-CF=CF-CF_3\\ \phantom{Rf_1}\diagup\\ Rf_2\end{array} \quad (I)$$

3 Claims, 2 Drawing Sheets

Related U.S. Application Data

(60) Provisional application No. 61/919,454, filed on Dec. 20, 2013.

(51) Int. Cl.
*A62D 1/02* (2006.01)
*F01K 25/08* (2006.01)

(52) U.S. Cl.
CPC .......... *F28D 15/00* (2013.01); *C08J 2375/04* (2013.01); *C09K 2205/22* (2013.01)

(56) References Cited

U.S. PATENT DOCUMENTS

| | | | |
|---|---|---|---|
| 4,221,876 A | 9/1980 | Wagner | |
| 4,247,653 A | 1/1981 | Wagner | |
| 4,324,716 A | 4/1982 | Reischl | |
| 4,326,086 A | 4/1982 | Mohring | |
| 4,341,909 A | 7/1982 | Schneider | |
| 4,541,943 A * | 9/1985 | Powell | C09K 5/045 252/67 |
| 4,985,556 A | 1/1991 | Abe | |
| 5,211,873 A * | 5/1993 | Dams | C08J 9/149 252/182.24 |
| 5,539,008 A * | 7/1996 | Dams | C08J 9/143 252/182.13 |
| 6,147,268 A * | 11/2000 | Mueller | B01D 15/00 210/502.1 |
| 6,486,114 B2 * | 11/2002 | Nalewajek | C08J 9/14 252/67 |
| 6,602,844 B2 * | 8/2003 | Kanno | C09K 5/10 438/692 |
| 8,049,022 B2 * | 11/2011 | Hierse | B01F 17/0035 510/490 |
| 2001/0012827 A1 * | 8/2001 | Nalewajek | C08J 9/14 510/408 |
| 2003/0199409 A1 * | 10/2003 | Kanno | C09K 5/10 510/177 |
| 2006/0010872 A1 | 1/2006 | Singh | |
| 2007/0100010 A1 * | 5/2007 | Creazzo | C08J 9/144 521/98 |
| 2010/0139274 A1 | 6/2010 | Zyhowski | |
| 2011/0054052 A1 | 3/2011 | Hwang | |
| 2012/0117991 A1 | 5/2012 | Rached | |
| 2012/0286192 A1 * | 11/2012 | Owens | C08J 9/146 252/67 |
| 2013/0091843 A1 | 4/2013 | Zyhowski | |
| 2013/0096218 A1 | 4/2013 | Rached | |
| 2013/0269958 A1 | 10/2013 | Zhang | |
| 2017/0198186 A1 * | 7/2017 | Bulinski | C09K 5/04 |
| 2017/0283365 A1 * | 10/2017 | Lamanna | C08J 9/14 |

FOREIGN PATENT DOCUMENTS

| | | |
|---|---|---|
| DE | 2706297 | 8/1978 |
| EP | 1951838 | 7/2013 |
| FR | 2980632 | 3/2013 |
| GB | 1012797 | 12/1965 |
| JP | S58-032200 | 10/1982 |
| JP | H04-110388 | 4/1992 |
| JP | H08-024363 | 1/1996 |
| JP | 2000-178560 | 6/2000 |
| WO | 1996/022356 | 7/1996 |
| WO | WO 1996-37540 | 11/1996 |
| WO | WO 2004-037913 | 5/2004 |
| WO | 2005/078046 | 8/2005 |
| WO | 2006/014609 | 2/2006 |
| WO | WO 2006-116371 | 11/2006 |
| WO | 2009/042855 | 4/2009 |
| WO | 2010/065895 | 6/2010 |
| WO | 2010/123671 | 10/2010 |
| WO | 2011/053628 | 5/2011 |
| WO | 2012/134803 | 10/2012 |
| WO | 2012/134860 | 10/2012 |
| WO | WO 2012-170196 | 12/2012 |
| WO | 2013/082575 | 6/2013 |

OTHER PUBLICATIONS

Cengel, Thermodynamics: An Engineering Approach, McGraw Hill pp. 553-555 and 557-559 (2006) 6 pages.
Ellis, Cleaning and Contamination of Electronics Components and Assemblies, 182-194 (1986).
Encyclopedia of Chemical Technology. Insulation, Thermal, pp. 648-662 (1995).
Klempner, The Handbook of Polymeric Foams and Foam Technology, Oxford University Press, p. 407 (1991) 1 page.
Lemmon, "Thermodynamic Properties of Propane. III. A Reference Equation of State for Temperatures from The Melting Line to 650 K and Pressures up to 1000 MPa," Journal of Chemical and Engineering Data, 2009, vol. 54, No. 12, pp. 3141-3180.
Peng, "A New Two Constant Equation of State," Industrial & Engineering Chemistry Fundamentals, 1976, vol. 15, No. 1, pp. 59-64.
Poling, The Properties of Gases and Liquids, McGraw-Hill pp. 2.3 and 2.9 (2000) 2 pages.
Rihani, "Estimation of Heat Capacity of Organic Compounds from Group Contributions," Industrial & Engineering Chemistry Fundamentals, Feb. 1965, vol. 4, No. 1, pp. 17-21.
Saunders, High Polymers, 32-54 and 65-88 (1962).
EP Supplementary Partial European Search Report, EP 14871928, dated Sep. 5, 2017 (10 pages).
International Search Report for PCT International Patent Application No. PCT/US2014/070766, dated Apr. 23, 2015, 5 pages.

* cited by examiner

FLUORINATED OLEFINS AS WORKING FLUIDS AND METHODS OF USING SAME

CROSS REFERENCE TO RELATED APPLICATIONS

This application is a continuation of U.S. application Ser. No. 15/105,103, filed Jun. 16, 2016, now allowed, which is a national stage filing under 35 U.S.C. 371 of PCT/US2014/070766, filed Dec. 17, 2014, which claims the benefit of U.S. Provisional Application No. 61/919,454, filed Dec. 20, 2013, the disclosure of which is incorporated by reference in their entirety herein.

FIELD

The present disclosure relates to working fluids that contain fluorinated olefins and methods of making and using the same.

BACKGROUND

Various working fluids that contain fluorinated olefins are described, for example, in JP 04110388, WO2004037913, U.S. Pat. No. 5,539,008, WO2006116371, US 20070100010 and WO20071053697.

SUMMARY

In some embodiments, an apparatus for heat transfer is provided. The apparatus includes a device and a mechanism for transferring heat to or from the device. The mechanism for transferring heat includes a heat transfer fluid that includes a compound represented by the following general formula (I):

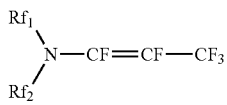

(I)

In Formula I: (i) $Rf_1$ and $Rf_2$ are independently linear or branched perfluoroalkyl groups having with 1-8 carbon atoms and optionally comprise at least one catenated heteroatom, or (ii) $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a method of transferring heat is provided. The method includes providing a device, and transferring heat to or from the device using a heat transfer fluid that comprises a compound represented by the general formula (I) above. $Rf_1$ and $Rf_2$ are independently linear or branched perfluoroalkyl groups having with 1-8 carbon atoms and optionally comprise at least one catenated heteroatom, or (ii) $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a fire extinguishing composition is provided. The composition includes a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The composition further includes at least one co-extinguishing agent comprising one or more hydrofluorocarbons, hydrochlorofluorocarbons, perfluorocarbons, perfluoropolyethers, hydrofluoroethers, hydrofluoropolyethers, chlorofluorocarbons, bromofluorocarbons, bromochlorofluorocarbons, iodofluorocarbons, hydrobromofluorocarbons, fluorinated ketones, hydrobromocarbons, fluorinated olefins, hydrofluoroolefins, fluorinated sulfones, fluorinated vinylethers, and mixtures thereof. The compound and the co-extinguishing agent are present in an amount sufficient to suppress or extinguish a fire.

In some embodiments, a method of extinguishing a fire is provided. The method includes applying to the fire a fire extinguishing composition comprising a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The method further includes suppressing the fire.

In some embodiments, an apparatus for converting thermal energy into mechanical energy in a Rankine cycle is provided. The apparatus includes a working fluid, a heat source to vaporize the working fluid and form a vaporized working fluid, a turbine through which the vaporized working fluid is passed thereby converting thermal energy into mechanical energy, a condenser to cool the vaporized working fluid after it is passed through the turbine; and a pump to recirculate the working fluid. The working fluid includes a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a process for converting thermal energy into mechanical energy in a Rankine cycle is provided. The process includes vaporizing a working fluid with a heat source to form a vaporized working fluid, expanding the vaporized working fluid through a turbine, cooling the vaporized working fluid using a cooling source to form a condensed working fluid, and pumping the condensed working fluid. The working fluid comprises a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a process for recovering waste heat is provided. The process includes passing a liquid working fluid through a heat exchanger in communication with a process that produces waste heat to produce a vaporized working fluid, removing the vaporized working fluid from the heat exchanger, and passing the vaporized working fluid through an expander. The waste heat is converted into mechanical energy. The process further includes cooling the vaporized working fluid after it has been passed through the expander. The working fluid includes a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a foamable composition is provided. The composition includes a blowing agent, a foamable polymer or a precursor composition thereof, and a nucleating agent. The nucleating agent includes a compound represented by the formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a process for preparing polymeric foam is provided. The process includes vaporizing at least one liquid or gaseous blowing agent or generating at least one gaseous blowing agent in the presence of at least one foamable polymer or a precursor composition thereof and a nucleating agent. The nucleating agent includes a compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

In some embodiments, a device is provided. The device includes a dielectric fluid that includes a compound represented by the general formula (I). $Rf_1$ and $Rf_2$ are independently linear or branched perfluoroalkyl groups having with 1-8 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The device is an electrical device.

In some embodiments, a coating composition is provided. The composition includes a solvent composition including a compound represented by the general formula (I) above. $Rf_1$ and $Rf_2$ are independently linear or branched perfluoroalkyl groups having with 1-8 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The coating composition further includes a coating material that is soluble or dispersible in said solvent composition.

In some embodiments, a cleaning composition is provided. The composition includes a solvent composition that includes a fluorinated olefin compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The cleaning composition further includes a co-solvent.

In some embodiments, a cleaning composition is provided. The cleaning composition includes a fluorinated olefin compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The cleaning composition further includes a surfactant.

In some embodiments, a process for removing contaminants from a substrate is provided. The process includes contacting a substrate with a composition that includes a fluorinated olefin compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The composition further includes a co-solvent.

In some embodiments, a process for removing contaminants from a substrate is provided. The process includes contacting a substrate with a composition that includes a fluorinated olefin compound represented by the general formula (I) above. $Rf_1$ and $Rf_2$ are independently linear or branched perfluoroalkyl groups having with 1-4 carbon atoms and optionally comprise at least one catenated heteroatom, or $Rf_1$ and $Rf_2$ are bonded together to form a ring structure having 4-6 carbon atoms and optionally comprise one or more catenated heteroatoms. If $Rf_1$ and $Rf_2$ are bonded together to form a ring structure comprising a nitrogen heteroatom, said nitrogen heteroatom is tertiary and is bonded to a perfluoroalkyl group having 1-3 carbon atoms. The composition further includes a surfactant.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

DETAILED DESCRIPTION

Figure 1:
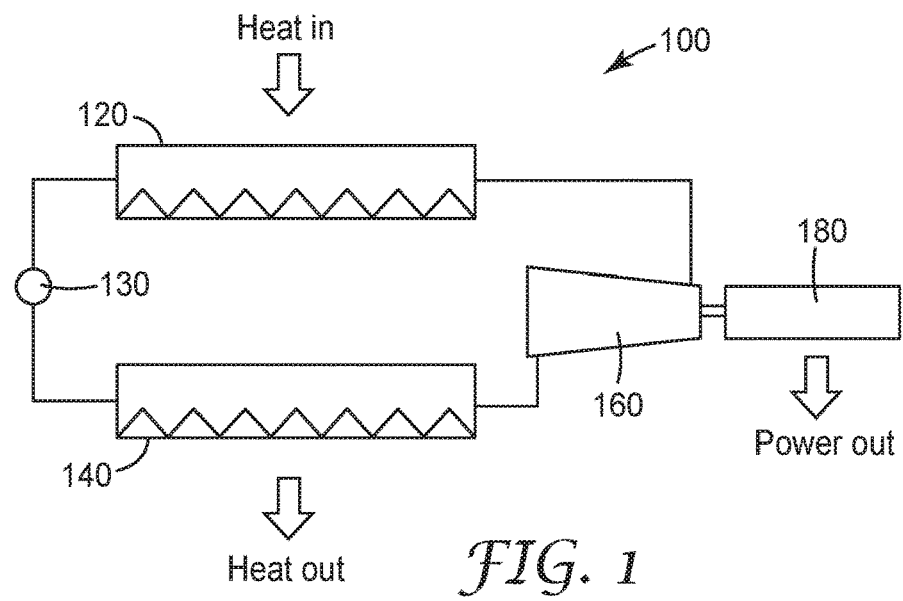
FIG. 1 is a schematic illustration of an apparatus for converting thermal energy into mechanical energy in a Rankine cycle.

In view of an increasing demand for environmentally friendly and lox toxicity chemical compounds, it is recognized that there exists an ongoing need for new working fluids exhibiting further reductions in environmental impact and toxicity, and which can meet the performance requirements of a variety of different applications, and be manufactured cost-effectively.

Definitions

As used herein, "catenated heteroatom" means an atom other than carbon (for example, oxygen, nitrogen, or sulfur) that is bonded to carbon atoms in a carbon chain so as to form a carbon-heteroatom-carbon chain.

As used herein, "fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom.

As used herein, "perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

As used herein, "substituted" (in reference to a group or moiety) means that at least one carbon-bonded hydrogen atom is replaced with an alkyl, fluoroalkyl, or perfluoroalkyl group that optionally contains one or more catenated heteroatoms.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

General Discussion

In some embodiments, the present disclosure is directed to compounds represented by the following general formula (I):

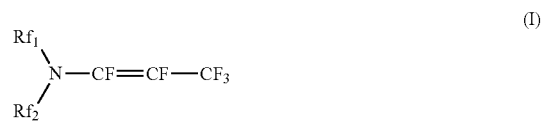

In illustrative embodiments, $Rf_1$ and $Rf_2$ may be independently linear or branched perfluoroalkyl groups having 1-8 carbon atoms, 2-6 carbon atoms, or 2-4 carbon atoms. In further embodiments, $Rf_1$ and $Rf_2$ may be bonded together to form a ring structure having 4-6 carbon atoms, 4-5 carbon atoms, or 4 carbon atoms. Optionally, $Rf_1$ and $Rf_2$ may include one or more catenated heteroatoms. In some embodiments, if $Rf_1$ and $Rf_2$ are bonded together to form a ring structure that comprises a nitrogen heteroatom, said nitrogen heteroatom may be tertiary and may be bonded to a perfluoroalkyl group having 1-3 carbon atoms or 2-3 carbon atoms.

Representative examples of the compounds of the present disclosure may include the following:

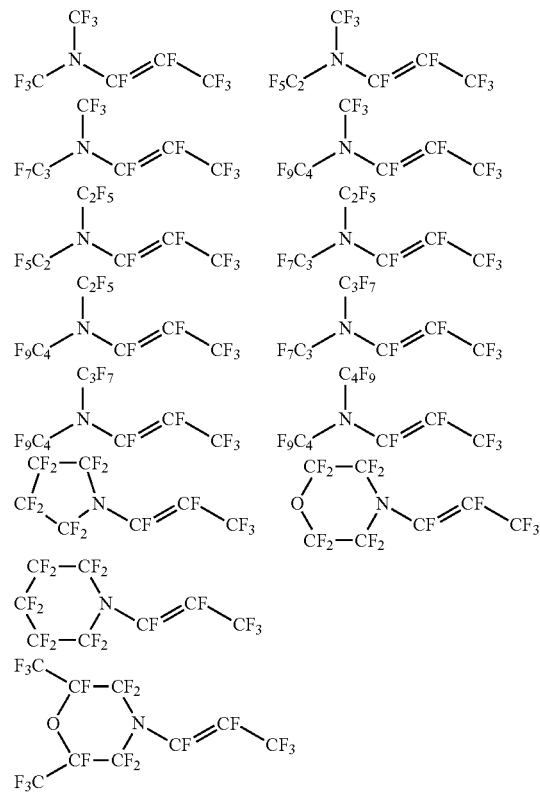

-continued

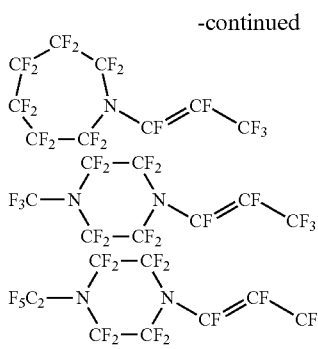

In some embodiments, the fluorinated olefin compounds of the present disclosure can be prepared by electrochemically fluorinating a methyl ester to produce the perfluorinated acyl fluoride. The methyl esters can be prepared by well known methods in the literature such as the Michael reaction of an amine with an alkene such as methyl methacrylate. Once prepared these organics can be made to undergo electrochemical fluorination by the method described in, for example, U.S. Pat. No. 2,713,593 (Brice et al.) and in R.E. Banks, Preparation, Properties and Industrial Applications of Organofluorine Compounds, pages 19-43, Halsted Press, New York (1982)). Upon isolation, these acid fluorides can be reacted with metal carbonate salts such as potassium carbonate and sodium carbonate at elevated temperatures to produce the compounds of the present disclosure.

Heat Transfer

In some embodiments, the present disclosure is directed to an apparatus for heat transfer that includes a device and a mechanism for transferring heat to or from the device. The mechanism for transferring heat may include a heat transfer fluid that includes a fluorinated olefin compound as described above with respect to formula (I). Among the compounds useful as heat transfer fluids include those having a molecular weight of between 200 and 500 or 280 and 500.

The provided apparatus for heat transfer may include a device. The device may be a component, work-piece, assembly, etc. to be cooled, heated or maintained at a predetermined temperature or temperature range. Such devices include electrical components, mechanical components and optical components. Examples of devices of the present disclosure include, but are not limited to microprocessors, wafers used to manufacture semiconductor devices, power control semiconductors, electrical distribution switch gear, power transformers, circuit boards, multi-chip modules, packaged and unpackaged semiconductor devices, lasers, chemical reactors, fuel cells, and electrochemical cells. In some embodiments, the device can include a chiller, a heater, or a combination thereof.

In yet other embodiments, the devices can include electronic devices, such as processors, including microprocessors. As these electronic devices become more powerful, the amount of heat generated per unit time increases. Therefore, the mechanism of heat transfer plays an important role in processor performance. The heat-transfer fluid typically has good heat transfer performance, good electrical compatibility (even if used in "indirect contact" applications such as those employing cold plates), as well as low toxicity, low (or non-) flammability and low environmental impact. Good electrical compatibility suggests that the heat-transfer fluid candidate exhibit high dielectric strength, high volume resistivity, and poor solvency for polar materials. Additionally, the heat-transfer fluid should exhibit good mechanical compatibility, that is, it should not affect typical materials of construction in an adverse manner.

The provided apparatus may include a mechanism for transferring heat. The mechanism may include a heat transfer fluid. The heat transfer fluid may include one or more fluorinated olefin compound as described above with respect to formula (I). Heat may be transferred by placing the heat transfer mechanism in thermal contact with the device. The heat transfer mechanism, when placed in thermal contact with the device, removes heat from the device or provides heat to the device, or maintains the device at a selected temperature or temperature range. The direction of heat flow (from device or to device) is determined by the relative temperature difference between the device and the heat transfer mechanism.

The heat transfer mechanism may include facilities for managing the heat-transfer fluid, including, but not limited to pumps, valves, fluid containment systems, pressure control systems, condensers, heat exchangers, heat sources, heat sinks, refrigeration systems, active temperature control systems, and passive temperature control systems. Examples of suitable heat transfer mechanisms include, but are not limited to, temperature controlled wafer chucks in plasma enhanced chemical vapor deposition (PECVD) tools, temperature-controlled test heads for die performance testing, temperature-controlled work zones within semiconductor process equipment, thermal shock test bath liquid reservoirs, and constant temperature baths. In some systems, such as etchers, ashers, PECVD chambers, vapor phase soldering devices, and thermal shock testers, the upper desired operating temperature may be as high as 170° C., as high as 200° C., or even as high as 230° C.

Heat can be transferred by placing the heat transfer mechanism in thermal contact with the device. The heat transfer mechanism, when placed in thermal contact with the device, removes heat from the device or provides heat to the device, or maintains the device at a selected temperature or temperature range. The direction of heat flow (from device or to device) is determined by the relative temperature difference between the device and the heat transfer mechanism. The provided apparatus can also include refrigeration systems, cooling systems, testing equipment and machining equipment. In some embodiments, the provided apparatus can be a constant temperature bath or a thermal shock test bath.

In other aspects, a method of transferring heat is provided that includes providing a device and transferring heat to or from the device using a mechanism. The mechanism can include a heat transfer fluid such as the fluorinated olefin compounds described above with respect to formula (I).

In addition to discovering that the fluorinated olefin compounds of the present disclosure possessed the requisite thermophysical properties for use as heat transfer fluids, the compounds were also found to demonstrate desirable environmental benefits. The fluorinated olefin compounds have been found to degrade in the environment on timescales that result in significantly reduced atmospheric lifetimes and lower global warming potentials compared to perfluorocarbons and perfluoropolyethers. The fluorinated olefin compounds were also found to have low toxicity.

Clean Extinguishing Agent (CEA) in some embodiments, the present disclosure is directed to a fire extinguishing composition. The composition may include one or more fluorinated olefin compounds (as described above with respect to formula (I)) and one or more co-extinguishing agents.

In various embodiments, the fluorinated olefin compounds may include those having a molecular weight of between 200 and 500.

In illustrative embodiments, the co-extinguishing agent may include hydrofluorocarbons, hydrochlorofluorocarbons, perfluorocarbons, perfluoropolyethers, hydrofluoroethers, hydrofluoropolyethers, chlorofluorocarbons, bromofluorocarbons, bromochlorofluorocarbons, hydrobromocarbons, iodofluorocarbons, fluorinated ketones, hydrofluorocarbons, hydrochlorofluorocarbons, perfluorocarbons, perfluoropolyethers, hydrofluoroethers, hydrofluoropolyethers, chlorofluorocarbons, bromofluorocarbons, bromochlorofluorocarbons, iodofluorocarbons, hydrobromofluorocarbons, fluorinated ketones, hydrobromocarbons, fluorinated olefins, hydrofluoroolefins, fluorinated sulfones, fluorinated vinylethers, and mixtures thereof.

Such co-extinguishing agents can be chosen to enhance the extinguishing capabilities or modify the physical properties (e.g., modify the rate of introduction by serving as a propellant) of an extinguishing composition for a particular type (or size or location) of fire and can preferably be utilized in ratios (of co-extinguishing agent to fluorinated olefin compounds(s)) such that the resulting composition does not form flammable mixtures in air.

In some embodiments, the fluorinated olefin compounds and the co-extinguishing agent may be present in the fire extinguishing composition in amounts sufficient to suppress or extinguish a fire. The fluorinated olefin compounds and the co-extinguishing agent can be in a weight ratio of from about 9:1 to about 1:9.

The fluorinated olefin compounds used in the provided compositions and methods are surprisingly effective in extinguishing fires or flames while leaving no residue (i.e., function as clean extinguishing agents). These compounds can be low in toxicity and flammability, can have no or very low ozone depletion potentials, and can have short atmospheric lifetimes and low global warming potentials relative to bromofluorocarbons, bromochlorofluorocarbons, and many substitutes thereof (e.g., hydrochlorofluorocarbons, hydrofluorocarbons, and perfluorocarbons). Since the compounds exhibit good extinguishing capabilities and are also environmentally acceptable, they satisfy the need for substitutes or replacements for the commonly-used bromine-containing fire extinguishing agents which have been linked to the destruction of the earth's ozone layer.

The provided fire extinguishing composition can typically be used in either the gaseous or the liquid state (or both), and any of the known techniques for introducing the composition to a fire can be utilized. For example, the composition can be introduced by streaming, e.g., using conventional portable (or fixed) fire extinguishing equipment, by misting, or by flooding, e.g., by releasing (using appropriate piping, valves, and controls) the composition into an enclosed space surrounding a fire or hazard. The provided composition can optionally be combined with inert propellant, e.g., nitrogen, argon, or carbon dioxide, to increase the rate of discharge of the composition from the streaming or flooding equipment utilized.

In some embodiments, a method of extinguishing a fire is provided that includes applying to a fire at least one fire extinguishing composition as described above, and suppressing the fire.

In addition to discovering that the fluorinated olefin compounds of the present disclosure possessed the requisite thermophysical properties for use as extinguishing agents, the compounds were also found to demonstrate desirable environmental benefits. The fluorinated olefin compounds have been found to degrade in the environment on timescales that result in significantly reduced atmospheric lifetimes and lower global warming potentials compared to perfluorocarbons and perfluoropolyethers. The fluorinated olefin compounds were also found to have low toxicity.

Organic Rankine-Cycle Working Fluid

In some embodiments, the present disclosure is directed to an apparatus for converting thermal energy into mechanical energy in a Rankine cycle. The apparatus may include a working fluid that includes one or more fluorinated olefin compounds as described above with respect to formula (I). The fluorinated olefin compounds may include those having a molecular weight of between 200 and 500. The apparatus may further include a heat source to vaporize the working fluid and form a vaporized working fluid, a turbine through which the vaporized working fluid is passed thereby converting thermal energy into mechanical energy, a condenser to cool the vaporized working fluid after it is passed through the turbine, and a pump to recirculate the working fluid.

A process for converting thermal energy into mechanical energy in a Rankine cycle is provided that includes a working fluid that includes one or more fluorinated olefin compounds as described above with respect to formula (I). Referring to FIG. 1, a typical Rankine cycle system 100 is shown that includes an evaporator/boiler 120 which receives heat from an external source. The evaporator/boiler 120 vaporizes an organic Rankine working fluid contained within the closed system 100. The Rankine cycle system 100 also includes a turbine 160 which is driven by the vaporized working fluid in the system and is used to turn a generator 180 thus producing electrical power. The vaporized working fluid is then channeled though a condenser 140 removing excess heat and reliquifying the liquid working fluid. A power pump 130 increases the pressure of the liquid leaving the condenser 140 and also pumps it back into the evaporator/boiler 120 for further use in the cycle. Heat released from the condenser 140 can then be used for other purposes including driving a secondary Rankine system (not shown).

Figure 2:
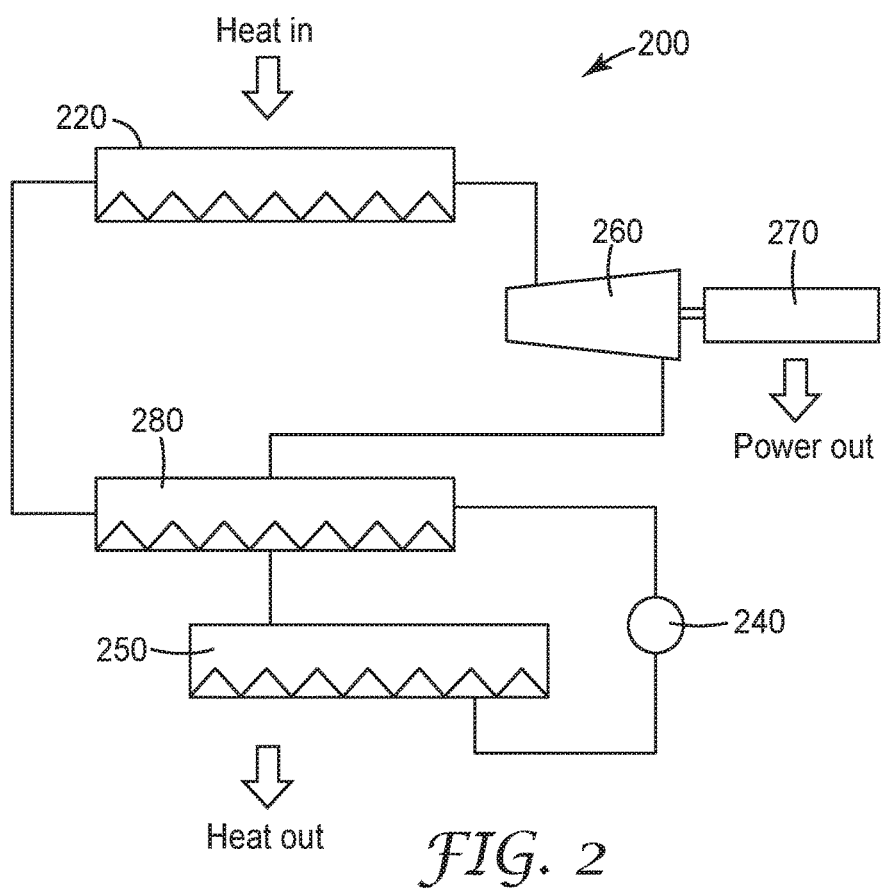
FIG. 2 is a schematic illustration of a Ranking cycle apparatus that includes a recuperator.

It is generally desirable to have fluids with saturated vapor curves that are either isentropic or have positive slope on a temperature-entropy diagram. In cases where the saturated vapor curve has a positive slope, Rankine cycle efficiency can be improved through the use of an extra heat exchanger (or recuperator) to recover heat from vapor exiting the expander and using the recovered heat to pre-heat liquid coming out of the pump. FIG. 2 is an illustration of Rankine cycle system that includes a recuperator.

Referring to FIG. 2, a Rankine cycle system 200 is shown that includes an evaporator/boiler 220 which receives heat from an external source. The evaporator/boiler 220 vaporizes an organic Rankine working fluid contained within the closed system 200. The Rankine cycle system 200 also includes a turbine 260 which is driven by the vaporized working fluid in the system and is used to turn a generator 270 thus producing electrical power. The vaporized working fluid is then channeled though a recuperator 280 removing some excess heat and from there to the condenser 250, where the working fluid condenses back to liquid. A power pump 240 increases the pressure of liquid leaving the condenser 250 and also pumps it back into the recuperator 280, where it is preheated before going back into the evaporator/boiler 220 for further use in the cycle. Heat released from the condenser 250 can then be used for other purposes including driving a secondary Rankine system (not shown).

In addition to discovering that the fluorinated olefin compounds of the present disclosure possessed the requisite thermophysical properties for use in organic Rankine systems, the compounds were also found to demonstrate desirable environmental benefits. The fluorinated olefin compounds have been found to degrade in the environment on timescales that result in significantly reduced atmospheric lifetimes and lower global warming potentials compared to perfluorocarbons and perfluoropolyethers. The fluorinated olefin compounds were also found to have low toxicity.

In some embodiments, the present disclosure relates to a process for converting thermal energy into mechanical energy in a Rankine cycle. The process may include using a heat source to vaporize a working fluid that includes one or more fluorinated olefin compounds as described above with respect to formula (I) to form a vaporized working fluid. In some embodiments, the heat is transferred from the heat source to the working fluid in an evaporator or boiler. The vaporized working fluid may pressurized and can be used to do work by expansion. The heat source can be of any form such as from fossil fuels, e.g., oil, coal, or natural gas. Additionally, in some embodiments, the heat source can come from nuclear power, solar power, or fuel cells. In other embodiments, the heat can be "waste heat" from other heat transfer systems that would otherwise be lost to the atmosphere. The "waste heat," in some embodiments, can be heat that is recovered from a second Rankine cycle system from the condenser or other cooling device in the second Rankine cycle.

An additional source of "waste heat" can be found at landfills where methane gas is flared off. In order to prevent methane gas from entering the environment and thus contributing to global warming, the methane gas generated by the landfills can be burned by way of "flares" producing carbon dioxide and water which are both less harmful to the environment in terms of global warming potential than methane. Other sources of "waste heat" that can be useful in the provided processes are geothermal sources and heat from other types of engines such as gas turbine engines that give off significant heat in their exhaust gases and to cooling liquids such as water and lubricants.

In the provided process, the vaporized working fluid may expanded though a device that can convert the pressurized working fluid into mechanical energy. In some embodiments, the vaporized working fluid is expanded through a turbine which can cause a shaft to rotate from the pressure of the vaporized working fluid expanding. The turbine can then be used to do mechanical work such as, in some embodiments, operate a generator, thus generating electricity. In other embodiments, the turbine can be used to drive belts, wheels, gears, or other devices that can transfer mechanical work or energy for use in attached or linked devices.

After the vaporized working fluid has been converted to mechanical energy the vaporized (and now expanded) working fluid can be condensed using a cooling source to liquefy for reuse. The heat released by the condenser can be used for other purposes including being recycled into the same or another Rankine cycle system, thus saving energy. Finally, the condensed working fluid can be pumped by way of a pump back into the boiler or evaporator for reuse in a closed system.

The desired thermodynamic characteristics of organic Rankine cycle working fluids are well known to those of ordinary skill and are discussed, for example, in U.S. Pat. Appl. Publ. No. 2010/0139274 (Zyhowski et al.). The greater the difference between the temperature of the heat source and the temperature of the condensed liquid or a provided heat sink after condensation, the higher the Rankine cycle thermodynamic efficiency. The thermodynamic efficiency is influenced by matching the working fluid to the heat source temperature. The closer the evaporating temperature of the working fluid to the source temperature, the higher the efficiency of the system. Toluene can be used, for example, in the temperature range of 79° C. (boiling point of toluene) to about 260° C., however toluene has toxicological and flammability concerns. Fluids such as 1,1-dichloro-2,2,2-trifluoroethane and 1,1,1,3,3-pentafluoropropane can be used in this temperature range as an alternative. But 1,1-dichloro-2,2,2-trifluoroethane can form toxic compounds below 300° C. and need to be limited to an evaporating temperature of about 93° C. to about 121° C. Thus, there is a desire for other environmentally-friendly Rankine cycle working fluids with higher critical temperatures so that source temperatures such as gas turbine and internal combustion engine exhaust can be better matched to the working fluid. Additionally, fluids with higher heat capacities contribute to higher Rankine cycle efficiencies due to increases thermal energy utilization-greater energy recovery from expansion.

Foam Blowing

The present disclosure relates to the use of fluorinated olefins as nucleating agents in the production of polymeric foams and in particular in the production of polyurethane foams and phenolic foams. In this regard, in some embodiments, the present disclosure is directed to a foamable composition that includes one or more blowing agents, one or more foamable polymers or precursor compositions thereof, and one or more nucleating agents that include a fluorinated olefin compound as described above with respect to formula (I). The fluorinated olefin compounds may include those having a molecular weight of between 200 and 400.

In some embodiments, a variety of blowing agents may be used in the provided foamable compositions including liquid or gaseous blowing agents that are vaporized in order to foam the polymer or gaseous blowing agents that are generated in situ in order to foam the polymer. Illustrative examples of blowing agents include chlorofluorocarbons (CFCs), hydrochlorofluorocarbons (HCFCs), hydrofluorocarbons (HFCs), hydrochlorocarbons (HCCs), iodofluorocarbons (IFCs), hydrocarbons, and hydrofluoroethers (HFEs). The blowing agent for use in the provided foamable compositions can have a boiling point of from about −45° C. to about 100° C. at atmospheric pressure. Typically, at atmospheric pressure the blowing agent has a boiling point of at least about 15° C., more typically between about 20° C. and about 80° C. The blowing agent can have a boiling point of between about 30° C. and about 65° C. Further illustrative examples of blowing agents that can be used in the invention include aliphatic and cycloaliphatic hydrocarbons having about 5 to about 7 carbon atoms, such as n-pentane and cyclopentane, esters such as methyl formate, CFCs such as $CFCl_3$ (CFC-11) and $CCl_2FCClF_2$ (CFC-113), HFCs such as $CF_3CF_2CHFCHFCF_3$, $CF_3CH_2CF_2H$, $CF_3CH_2CF_2CH_3$, $CF_3CF_2H$, $CH_3CF_2H$ (HFC-152a), $CF_3CH_2CH_2CF_3$ and $CHF_2CF_2CH_2F$, HCFCs such as $CH_3CCl_2F$, $CF_3CHCl_2$, HCCs such as 2-chloropropane, and IFCs such as $CF_3I$, and HFEs such as $C_4F_9OCH_3$. In certain formulations $CO_2$ generated from the reaction of water with foam precursor such as an isocyanate can be used as a blowing agent.

In various embodiments, the provided foamable composition may also include one or more foamable polymers or a precursors composition thereof. Foamable polymers suitable for use in the provided foamable compositions include, for example, polyolefins, e.g., polystyrene, poly(vinyl chloride), and polyethylene. Foams can be prepared from styrene polymers using conventional extrusion methods. The blowing agent composition can be injected into a heat-plastified styrene polymer stream within an extruder and admixed therewith prior to extrusion to form foam. Representative examples of suitable styrene polymers include, for example, the solid homopolymers of styrene, α-methylstyrene, ring-alkylated styrenes, and ring-halogenated styrenes, as well as copolymers of these monomers with minor amounts of other readily copolymerizable olefinic monomers, e.g., methyl methacrylate, acrylonitrile, maleic anhydride, citraconic anhydride, itaconic anhydride, acrylic acid, N-vinylcarbazole, butadiene, and divinylbenzene. Suitable vinyl chloride polymers include, for example, vinyl chloride homopolymer and copolymers of vinyl chloride with other vinyl monomers. Ethylene homopolymers and copolymers of ethylene with, e.g., 2-butene, acrylic acid, propylene, or butadiene may also be useful. Mixtures of different types of polymers can be employed.

Precursors of foamable polymers suitable for use in the provided foamable compositions may include, for example, precursors of phenolic polymers, silicone polymers, and isocyanate-based polymers, e.g., polyurethane, polyisocyanurate, polyurea, polycarbodiimide, and polyimide. Typically, precursors of isocyanate-based polymers are utilized as the blowing agent for preparing polyurethane or polyisocyanurate foams.

Polyisocyanates suitable for use in the provided foamable compositions include aliphatic, alicyclic, arylaliphatic, aromatic, or heterocyclic polyisocyanates, or combinations thereof. Any polyisocyanate which is suitable for use in the production of polymeric foams can be utilized. For example, aromatic diisocyanates such as toluene and diphenylmethane diisocyanates in pure, modified, or crude form may be employed. MDI variants (diphenylmethane diisocyanate modified by the introduction of urethane, allophanate, urea, biuret, carbodiimide, uretonimine, or isocyanurate residues) and the mixtures of diphenylmethane diisocyanates and oligomers thereof known in the art as crude or polymeric MDI (polymethylene polyphenylene polyisocyanates) may be useful. Representative examples of suitable polyisocyanates include, for example, ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate (and mixtures of these isomers), diisocyanato-3,3,5-trimethyl-5-isocyanatomethyl cyclohexane, 2,4- and 2,6-toluene diisocyanate (and mixtures of these isomers), diphenylmethane-2,4'- and/or -4,4'-diisocyanate, naphthalene-1,5-diisocyanate, the reaction products of four equivalents of the aforementioned isocyanate-containing compounds with compounds containing two isocyanate-reactive groups, triphenyl methane-4,4',4"-triisocyanate, polymethylene polyphenylene polyisocyanates, m- and p-isocyanatophenyl sulfonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals, polyisocyanates containing polymeric fatty acid esters, and mixtures thereof. Distillation residues (obtained in the commercial production of isocyanates) having isocyanate groups can also be used alone or in solution in one or more of the above-mentioned polyisocyanates.

Reactive hydrogen-containing compounds suitable for use in the foamable compositions of the invention are those having at least two isocyanate-reactive hydrogen atoms, for example, in the form of hydroxyl, primary or secondary amine, carboxylic acid, or thiol groups, or a combination thereof. Polyols, i.e., compounds having at least two hydroxyl groups per molecule, due to their desirable reactivity with polyisocyanates, may be employed. Such polyols can be, e.g., polyesters, polyethers, polythioethers, polyacetals, polycarbonates, polymethacrylates, polyester amides, or hydroxyl-containing prepolymers of these compounds and a less than stoichiometric amount of polyisocyanate.

Representative examples of suitable reactive hydrogen-containing compounds have been described, e.g., by J. H. Saunders and K. C. Frisch in *High Polymers*, Volume XVI, "Polyurethanes," Part I, pages 32-54 and 65-88, Interscience, New York (1962). Mixtures of such compounds are also useful, and, in some cases, may be used to combine low-melting and high-melting polyhydroxyl-containing compounds with one another, as described in DE 2,706,297 (Bayer A G). Useful polyols include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis(hydroxymethyl)cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenyl propane, and dihydroxymethyl hydroquinone. Other suitable polyols include the condensation products of polybasic acids and polyols such as polyethylene adipate and polycaprolactone-based polyols, as well as the mixtures of hydroxy aldehydes and hydroxy ketones ("formose") and the polyhydric alcohols obtained therefrom by reduction ("formitol") that are formed in the autocondensation of formaldehyde hydrate in the presence of metal compounds as catalysts and compounds capable of enediol formation as co-catalysts (see, e.g., U.S. Pat. No. 4,341,909 (Schneider et al.), U.S. Pat. No. 4,247,653 (Wagner), U.S. Pat. No. 4,221,876 (Wagner), U.S. Pat. No. 4,326,086 (Mohring et al.), and U.S. Pat. No. 4,205,138 (Muller et al.), as well as CA U.S. Pat. No. 1,088,523 (Bayer A G)). Solutions of polyisocyanate polyaddition products, particularly solutions of polyurethane ureas containing ionic groups and/or solutions of polyhydrazodicarbonamides, in low molecular weight polyhydric alcohols can also be used (see DE 2,638,759).

Many other compounds containing isocyanate-reactive hydrogen atoms are useful in the preferred foamable compositions of the invention, as will be apparent to those skilled in the art of polyurethane science and technology.

Phenolic polymer precursors suitable for use in the provided foamable compositions include, for example, the reaction product of a phenol and an aldehyde in the presence of a catalyst. Illustrative uses of phenolic foams of this invention include use for roofing insulation, as sheathing products for external wall insulation for building applications, and for shaped parts such as pipe and block insulation for industrial applications, as described in "Thermal Insulation," *Encyclopedia of Chemical Technology*, vol. 14, pages 648-662 (4th ed., John Wiley & Sons, 1995).

The provided foamable compositions may include a nucleating agent that includes a fluorinated olefin compound as described above with respect to formula (I). The *Handbook of Polymeric Foams and Foam Technology*, Daniel Klempner and Kurt C. Frisch, ed., (Oxford University Press, 1991), discloses that formation of uniform, fine cellular structure can be obtained by using "nucleazites", also referred to as nucleating agents.

In various embodiments, the foamable compositions of the present disclosure may have a molar ratio of nucleating agent to blowing agent of no more than 1:50, 1:25, 1:9, or 1:7, 1:3, or 1:2.

Other conventional components of foam formulations can, optionally, be present in the foamable compositions of the present disclosure. For example, cross-linking or chain-extending agents, foam-stabilizing agents or surfactants, catalysts and fire-retardants can be utilized. Other possible components include fillers (e.g., carbon black), colorants, fungicides, bactericides, antioxidants, reinforcing agents, antistatic agents, and other additives or processing aids.

In some embodiments, polymeric foams can be prepared by vaporizing at least one liquid or gaseous blowing agent or generating at least one gaseous blowing agent in the presence of at least one foamable polymer or a precursor composition thereof and a nucleating agent as described above. In further embodiments, polymeric foams can be prepared using the provided foamable compositions by vaporizing (e.g., by utilizing the heat of precursor reaction) at least one blowing agent in the presence of a nucleating agent as described above, at least one organic polyisocyanate and at least one compound containing at least two reactive hydrogen atoms. In making a polyisocyanate-based foam, the polyisocyanate, reactive hydrogen-containing compound, and blowing agent composition can generally be combined, thoroughly mixed (using, e.g., any of the various known types of mixing head and spray apparatus), and permitted to expand and cure into a cellular polymer. It is often convenient, but not necessary, to preblend certain of the components of the foamable composition prior to reaction of the polyisocyanate and the reactive hydrogen-containing compound. For example, it is often useful to first blend the reactive hydrogen-containing compound, blowing agent composition, and any other components (e.g., surfactant) except the polyisocyanate, and to then combine the resulting mixture with the polyisocyanate. Alternatively, all components of the foamable composition can be introduced separately. It is also possible to pre-react all or a portion of the reactive hydrogen-containing compound with the polyisocyanate to form a prepolymer.

In addition to providing useful performance as nucleating agents, the fluorinated olefins useful herein can offer additional important benefits in safety of use and in environmental compatibility (e.g., zero ozone depletion potential and low atmospheric lifetime as compared to perfluoroalkanes). The fluorinated olefins described herein are non-ozone depleting and as a result of their degradation in the lower atmosphere, have short atmospheric lifetimes, and would not be expected to contribute significantly to global warming. Further, polymeric foams produced in accordance with the invention have excellent thermal insulation properties and low toxicity.

Dielectric

In some embodiments, the present disclosure is directed to dielectric fluids that include one or more a fluorinated olefin compounds as described above with respect to formula (I), as well as electrical devices (e.g., capacitors, switchgear, transformers, or electric cables or buses) that include such dielectric fluids. For purposes of the present application, the term "dielectric fluid" is inclusive of both liquid dielectrics and gaseous dielectrics. The physical state of the fluid, gaseous or liquid, is determined at the operating conditions of temperature and pressure of the electrical device in which it is used.

In some embodiments, the dielectric fluids include one or more fluorinated olefin compounds as described above with respect to formula (I) and, optionally, one or more second dielectric fluids. The fluorinated olefin compounds may include those having a molecular weight of between 200 and 500. Suitable second dielectric fluids include, for example, air, nitrogen, helium, argon, and carbon dioxide, or combinations thereof. The second dielectric fluid may be a non-condensable gas or an inert gas. Generally, the second dielectric fluid may be used in amounts such that vapor pressure is at least 70 kPa at 25° C., or at the operating temperature of the electrical device.

The dielectric fluids of the present application are useful for electrical insulation and for arc quenching and current interruption equipment used in the transmission and distribution of electrical energy. Generally, there are three major types of electrical devices in which the fluids of the present disclosure can be used: (1) gas-insulated circuit breakers and current-interruption equipment, (2) gas-insulated transmission lines, and (3) gas-insulated transformers. Such gas-insulated equipment is a major component of power transmission and distribution systems.

In some embodiments, the present disclosure provides electrical devices, such as capacitors, comprising metal electrodes spaced from each other such that the gaseous dielectric fills the space between the electrodes. The interior space of the electrical device may also comprise a reservoir of the liquid dielectric fluid which is in equilibrium with the gaseous dielectric fluid. Thus, the reservoir may replenish any losses of the dielectric fluid.

In addition to discovering that the fluorinated olefin compounds of the present disclosure possessed the requisite thermophysical properties for use as dielectric fluids, the compounds were also found to demonstrate desirable environmental benefits. The fluorinated olefin compounds have been found to degrade in the environment on timescales that result in significantly reduced atmospheric lifetimes and lower global warming potentials compared to the industry standard fluids (e.g., SF6). The fluorinated olefin compounds were also found to have low toxicity.

Coating/Lubricant

In some embodiments, the present disclosure relates to coating compositions that include a solvent composition that includes one or more fluorinated olefin compounds as described above with respect to formula (I), and one or more coating materials which are soluble or dispersible in the solvent composition. The fluorinated olefin compounds may include those having a molecular weight of between 200 and 500.

In various embodiments, the coating materials of the coating compositions may include pigments, lubricants, stabilizers, adhesives, anti-oxidants, dyes, polymers, pharmaceuticals, release agents, inorganic oxides, and the like, and combinations thereof. For example, coating materials may include perfluoropolyether, hydrocarbon, and silicone lubricants; amorphous copolymers of tetrafluoroethylene; polytetrafluoroethylene; or combinations thereof. Further examples of suitable coating materials include titanium dioxide, iron oxides, magnesium oxide, perfluoropolyethers, polysiloxanes, stearic acid, acrylic adhesives, polytetrafluoroethylene, amorphous copolymers of tetrafluoroethylene, or combinations thereof.

In some embodiments, the above-described coating compositions can be useful in coating deposition, where the fluorinated olefin compounds function as a carrier for a coating material to enable deposition of the material on the surface of a substrate. In this regard, the present disclosure further relates to a process for depositing a coating on a substrate surface using the coating composition. The process comprises the step of applying to at least a portion of at least one surface of a substrate a coating of a liquid coating composition comprising (a) a solvent composition containing one or more fluorinated olefin compounds as described above with respect to formula (I); and (b) one or more coating materials which are soluble or dispersible in the solvent composition. The solvent composition can further comprise one or more co-dispersants or co-solvents and/or one or more additives (e.g., surfactants, coloring agents, stabilizers, anti-oxidants, flame retardants, and the like). Preferably, the process further comprises the step of removing the solvent composition from the coating by, e.g., allowing evaporation (which can be aided by the application of, e.g., heat or vacuum).

In various embodiments, to form a coating composition, the components of the coating composition (i.e., the fluorinated olefin compound(s), the coating material(s), and any co-dispersant(s) or co-solvent(s) utilized) can be combined by any conventional mixing technique used for dissolving, dispersing, or emulsifying coating materials, e.g., by mechanical agitation, ultrasonic agitation, manual agitation, and the like. The solvent composition and the coating material(s) can be combined in any ratio depending upon the desired thickness of the coating. For example, the coating material(s) may constitute from about 0.1 to about 10 weight percent of the coating composition.

In illustrative embodiments, the deposition process of the disclosure can be carried out by applying the coating composition to a substrate by any conventional technique. For example, the composition can be brushed or sprayed (e.g., as an aerosol) onto the substrate, or the substrate can be spin-coated. In some embodiments, the substrate may be coated by immersion in the composition. Immersion can be carried out at any suitable temperature and can be maintained for any convenient length of time. If the substrate is a tubing, such as a catheter, and it is desired to ensure that the composition coats the lumen wall, the composition may be drawn into the lumen by the application of reduced pressure.

In various embodiments, after a coating is applied to a substrate, the solvent composition can be removed from the coating (e.g., by evaporation). If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

Both organic and inorganic substrates can be coated by the processes of the present disclosure. Representative examples of the substrates include metals, ceramics, glass, polycarbonate, polystyrene, acrylonitrile-butadiene-styrene copolymer, natural fibers (and fabrics derived therefrom) such as cotton, silk, fur, suede, leather, linen, and wool, synthetic fibers (and fabrics) such as polyester, rayon, acrylics, nylon, or blends thereof, fabrics including a blend of natural and synthetic fibers, and composites of the foregoing materials. In some embodiments, substrates that may be coated include, for example, magnetic hard disks or electrical connectors with perfluoropolyether lubricants or medical devices with silicone lubricants.

Cleaning

In some embodiments, the present disclosure relates to cleaning compositions that include one or more fluorinated olefin compounds as described above with respect to formula (I), and one or more co-solvents. The fluorinated olefin compounds may include those having a molecular weight of between 200 and 400.

In some embodiments, the fluorinated olefin compounds may be greater than 50 weight percent, greater than 60 weight percent, greater than 70 weight percent, or greater than 80 weight percent based upon the total weights of the fluorinated olefin compounds and the co-solvent(s).

In various embodiments, the cleaning composition may further comprise a surfactant. Suitable surfactants include those surfactants that are sufficiently soluble in the fluorinated olefin, and which promote soil removal by dissolving, dispersing or displacing the soil. One useful class of surfactants are those nonionic surfactants that have a hydrophilic-lipophilic balance (HLB) value of less than about 14. Examples include ethoxylated alcohols, ethoxylatedalkyl phenols, ethoxylated fatty acids, alkylarysulfonates, glycerol esters, ethoxylated fluoroalcohols, and fluorinated sulfonamides. Mixtures of surfactants having complementary properties may be used in which one surfactant is added to the cleaning composition to promote oily soil removal and another added to promote water-solubles oil removal. The surfactant, if used, can be added in an amount sufficient to promote soil removal. Typically, surfactant is added in amounts from about 0.1 to 5.0 wt. %, preferably in amounts from about 0.2 to 2.0 wt. % of the cleaning composition.

In illustrative embodiments, the co-solvent may include alcohols, ethers, alkanes, alkenes, haloalkenes, perfluorocarbons, perfluorinated tertiary amines, perfluoroethers, cycloalkanes, esters, ketones, aromatics, haloaromatics, siloxanes, hydrochlorocarbons, hydrochlorofluorocarbons, hydrofluorocarbons, or mixtures thereof. Representative examples of co-solvents which can be used in the cleaning composition include methanol, ethanol, isopropanol, t-butyl alcohol, methyl t-butyl ether, methyl t-amyl ether, 1,2-dimethoxyethane, cyclohexane, 2,2,4-trimethylpentane, n-decane, terpenes (e.g., a-pinene, camphene, and limonene), trans-1,2-dichloroethylene, cis-1,2-dichloroethylene, methylcyclopentane, decalin, methyl decanoate, t-butyl acetate, ethyl acetate, diethyl phthalate, 2-butanone, methyl isobutyl ketone, naphthalene, toluene, p-chlorobenzotrifluoride, trifluorotoluene, bis(trifluoromethyl)benzenes, hexamethyl disiloxane, octamethyl trisiloxane, perfluorohexane, perfluoroheptane, perfluorooctane, perfluorotributylamine, perfluoro-N-methyl morpholine, perfluoro-2-butyl oxacyclopentane, methylene chloride, chlorocyclohexane, 1-chlorobutane, 1,1-dichloro-1-fluoroethane, 1,1,1-trifluoro-2,2-dichloroethane, 1,1,1,2,2-pentafluoro-3,3-dichloropropane, 1,1,2,2,3-pentafluoro-1,3-dichloropropane, 2,3-dihydroperfluoropentane, 1,1,1,2,2,4-hexafluorobutane, 1-trifluoromethyl-1,2,2-trifluorocyclobutane, 3-methyl-1,1,2,2-tetrafluorocyclobutane, 1-hydropentadecafluoroheptane, or mixtures thereof.

In some embodiments, the present disclosure relates to a process for cleaning a substrate. The cleaning process can be carried out by contacting a contaminated substrate with a cleaning composition as discussed above. The fluorinated olefin compounds can be utilized alone or in admixture with each other or with other commonly-used cleaning solvents, e.g., alcohols, ethers, alkanes, alkenes, perfluorocarbons, perfluorinated tertiary amines, perfluoroethers, cycloalkanes, esters, ketones, aromatics, siloxanes, hydrochlorocarbons, hydrochlorofluorocarbons, hydrofluorocarbons, or mixtures thereof. Such co-solvents can be chosen to modify or enhance the solvency properties of a cleaning composition for a particular use and can be utilized in ratios (of co-solvent to fluorinated olefin compound(s)) such that the resulting composition has no flash point. If desirable for a particular application, the cleaning composition can further contain one or more dissolved or dispersed gaseous, liquid, or solid additives (for example, carbon dioxide gas, surfactants, stabilizers, antioxidants, or activated carbon).

In some embodiments, the present disclosure relates to cleaning compositions that include one or more fluorinated olefin compounds as described above with respect to formula (I), and optionally one or more surfactants. The fluorinated olefin compounds may include those having a molecular weight of between 200 and 400. Suitable surfactants include those surfactants that are sufficiently soluble in the fluorinated olefin compounds, and which promote soil removal by dissolving, dispersing or displacing the soil. One useful class of surfactants are those nonionic surfactants that have a hydrophilic-lipophilic balance (HLB) value of less than about 14. Examples include ethoxylated alcohols, ethoxylated alkylphenols, ethoxylated fatty acids, alkylaryl sulfonates, glycerol esters, ethoxylated fluoroalcohols, and fluorinated sulfonamides. Mixtures of surfactants having complementary properties may be used in which one surfactant is added to the cleaning composition to promote oily soil removal and another added to promote water-soluble soil removal. The surfactant, if used, can be added in an amount sufficient to promote soil removal. Typically, surfactant may be added in amounts from 0.1 to 5.0 wt. % or from 0.2 to 2.0 wt. % of the cleaning composition.

The cleaning processes of the disclosure can also be used to dissolve or remove most contaminants from the surface of a substrate. For example, materials such as light hydrocarbon contaminants; higher molecular weight hydrocarbon contaminants such as mineral oils and greases; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; water; and other contaminants encountered in precision, electronic, metal, and medical device cleaning can be removed.

The cleaning compositions can be used in either the gaseous or the liquid state (or both), and any of known or future techniques for "contacting" a substrate can be utilized. For example, a liquid cleaning composition can be sprayed or brushed onto the substrate, a gaseous cleaning composition can be blown across the substrate, or the substrate can be immersed in either a gaseous or a liquid composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182-94 (1986).

Both organic and inorganic substrates can be cleaned by the processes of the present disclosure. Representative examples of the substrates include metals; ceramics; glass; polycarbonate; polystyrene; acrylonitrile-butadiene-styrene copolymer; natural fibers (and fabrics derived therefrom) such as cotton, silk, fur, suede, leather, linen, and wool; synthetic fibers (and fabrics) such as polyester, rayon, acrylics, nylon, or blends thereof; fabrics comprising a blend of natural and synthetic fibers; and composites of the foregoing materials. In some embodiments, the process may be used in the precision cleaning of electronic components (e.g., circuit boards), optical or magnetic media, or medical devices.

The cleaning compositions of the present disclosure satisfy a need in the art for substitutes or replacements for the commonly-used cleaning solvents. For example, the cleaning compositions have low ozone depletion potential, have boiling ranges suitable for a variety of solvent cleaning applications, and have the ability to dissolve both hydrocarbon-based and fluorocarbon-based soils. The cleaning compositions are also low in toxicity, have no flash points (as measured by ASTM D3278-89), have acceptable stability for use in cleaning applications, and have short atmospheric lifetimes and low global warming potentials.

In some embodiments, the fluorinated olefin compounds of the present disclosure may be hydrophobic, relatively chemically unreactive, and thermally stable. The fluorinated olefin compounds of the present disclosure may have a low environmental impact. In this regard, the fluorinated olefin compounds of the present disclosure may have a global warming potential (GWP) of less than 10, less than 5, or even less than 2. As used herein, GWP is a relative measure of the warming potential of a compound based on the structure of the compound. The GWP of a compound, as defined by the Intergovernmental Panel on Climate Change (IPCC) in 1990 and updated in 2007, is calculated as the warming due to the release of 1 kilogram of a compound relative to the warming due to the release of 1 kilogram of $CO_2$ over a specified integration time horizon (ITH).

$$GWP_i(t') = \frac{\int_0^{ITH} a_i [C(t)] dt}{\int_0^{ITH} a_{CO_2} [C_{CO_2}(t)] dt} = \frac{\int_0^{ITH} a_i C_{oi} e^{-t/\tau_i} dt}{\int_0^{ITH} a_{CO_2} [C_{CO_2}(t)] dt}$$

In this equation $a_i$ is the radiative forcing per unit mass increase of a compound in the atmosphere (the change in the flux of radiation through the atmosphere due to the IR absorbance of that compound), C is the atmospheric concentration of a compound, $\tau$ is the atmospheric lifetime of a compound, t is time, and i is the compound of interest. The commonly accepted ITH is 100 years representing a compromise between short-term effects (20 years) and longer-term effects (500 years or longer). The concentration of an organic compound, i, in the atmosphere is assumed to follow pseudo first order kinetics (i.e., exponential decay). The concentration of $CO_2$ over that same time interval incorporates a more complex model for the exchange and removal of $CO_2$ from the atmosphere (the Bern carbon cycle model).

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

Preparatory Examples

Other embodiments of the invention are within the scope of the appended claims.

Preparatory Example 1

Preparation of 1,2,3,3,3-pentafluoro-N,N-bis(trifluoromethyl)prop-1-en-1-amine $(CF_3)_2NCF\!\!=\!\!CFCF_3$ 1,2,3,3,3-pentafluoro-N,N-bis(trifluoromethyl)prop-1-en-1-amine was prepared in a 2.5" i.d. by 8" stainless steel tubular reactor. K2CO3 (304 g, 2.20 mol, Sigma-Aldrich) (dried in vacuum oven at 120° C. overnight) was added to the reactor and the reactor was heated to 225 C. Then 2-[[bis(trifluoromethyl)amino]-difluoro-methyl]-2,3,3,3-tetrafluoro-propanoyl fluoride (155 g, 0.44 mol) (prepared via electrochemical fluorination of methyl 3-(dimethylamino)-2-methyl-propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982)) was pumped continuously to the reactor at a flow rate of 45 ml/hr. The gaseous product vapor flowed through a water cooled condenser and was collected in a receiver flask cooled in dry ice and equipped with a dry ice condenser. A total of 93 g of product was collected. The resulting product was fractionally distilled (estimated b.p.=35 C). The product structure was verified by GC/MS.

Preparatory Example 2

Preparation of 2,2,3,3,5,5,6,6-octafluoro-4-(1,2,3,3,3-pentafluoroprop-1-enyl)morpholine

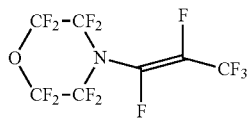

2,2,3,3,5,5,6,6-octafluoro-4-(1,2,3,3,3-pentafluoroprop-1-enyl)morpholine was prepared in a hot tube reactor. In the hot tube reactor, anhydrous potassium carbonate (400 g, 2.9 mol, Sigma-Aldrich) was charged. The reactor was sealed and connected to a high pressure syringe pump. The reactor was heated to a temperature of 220° C. 2-[difluoro-(2,2,3,3,5,5,6,6-octafluoromorpholin-4-yl)methyl]-2,3,3,3-tetrafluoro-propanoyl fluoride (470 g 1.1 mol) (prepared via electrochemical fluorination of methyl 2-methyl-3-morpholino-propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982)) was then pumped to the hot tube reactor at a rate of 100 mL/hour. The product was collected using a dry ice trap at −78° C. A total of 345 g of material was collected which was ~70% converted to the desired product. The remaining material was unreacted acid fluoride and inert fluorocarbon. The material was fractionally distilled and its boiling point is about 85° C. The product structure was verified by GC/MS and F-19 and H-1 NMR.

Preparatory Example 3

Preparation of 2,2,3,3,5,5,6,6-octafluoro-1-[1,2,3,3,3-pentafluoroprop-1-enyl]-4-(trifluoromethyl)piperazine

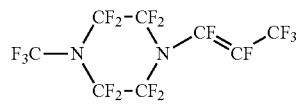

2-[difluoro-[2,2,3,3,5,5,6,6-octafluoro-4-(trifluoromethyl)piperazin-1-yl]methyl]-2,3,3,3-tetrafluoro-propanoyl fluoride (461.5 grams at 81.4% pure, 0.76 moles), prepared by electrochemical fluorination of methyl 2-methyl-3-(4-methylpiperazin-1-yl)propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982), was fed at a rate of 32 ml/hour into 500 grams (3.62 moles, Sigma-Aldrich) of anhydrous potassium carbonate at 220 C using the apparatus of Example 1. 344 grams of material was collected and fractionally distilled using a 30-tray vacuum jacketed Oldershaw column to provide 116.2 grams of a mixture of cis and trans isomers of 2,2,3,3,5,5,6,6-octafluoro-1-[1,2,3,3,3-pentafluoroprop-1-enyl]-4-(trifluoromethyl)piperazine. The boiling point is approximately 115 C. The structure was confirmed by gc/ms.

Preparatory Example 4

Preparation of 1,2,3,3,3-pentafluoro-N,N-bis(1,1,2,2,2-pentafluoroethyl)prop-1-en-1-amine

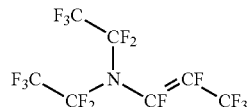

2-[[bis(1,1,2,2,2-pentafluoroethyl)amino]-difluoromethyl]-2,3,3,3-tetrafluoro-propanoyl fluoride (402 grams at 68.9% pure, 0.62 moles) prepared by electrochemical fluorination of methyl 2-methyl-3-(4-methylpiperazin-1-yl)propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982), was fed at a rate of 36 ml/hour to a bed of 550 grams (3.98 moles, Sigma-Aldrich) of anhydrous potassium carbonate at 220° C. using the apparatus of Example 1. 298.7 grams of material was collected and fractionally distilled using a 30-tray vacuum jacketed Oldershaw column to provide 82.5 grams of a mixture of cis and trans isomers of 1,2,3,3,3-pentafluoro-N,N-bis(1,1,2,2,2-pentafluoroethyl)prop-1-en-1-amine The boiling point is approximately 89.2° C. The structure was confirmed by gc/ms.

Preparatory Example 5

Preparation of 1,2,3,3,3-pentafluoro-N-(1,1,2,2,2-pentafluoroethyl)-N-(trifluoromethyl)prop-1-en-1-amine

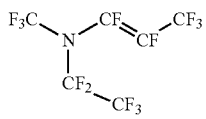

2-[difluoro-[1,1,2,2,2-pentafluoroethyl(trifluoromethyl)amino]methyl]-2,3,3,3-tetrafluoro-propanoyl fluoride (309 grams at 80% pure, 0.77 moles) prepared by electrochemical fluorination of methyl 3-imidazol-1-yl-2-methyl-propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982) was fed at a rate of 40 ml/hour to a bed of 550 grams (3.98 moles, Sigma-Aldrich) of anhydrous potassium carbonate at 220° C. using the apparatus of Example 1. 200.6 grams of material was collected and fractionally distilled using a 30-tray vacuum jacketed Oldershaw column to provide 33.8 grams (99.0% pure) of a mixture of cis and trans isomers of 1,2,3,3,3-pentafluoro-N-(1,1,2,2,2-pentafluoroethyl)-N-(trifluoromethyl)prop-1-en-1-amine The boiling point is approximately 65° C. The structure was confirmed by gc/ms.

Preparatory Example 6

Preparation of 2,2,3,3,4,4,5,5-octafluoro-1-[1,2,3,3,3-pentafluoroprop-1-enyl]pyrrolidine

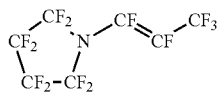

2-[difluoro-(2,2,3,3,4,4,5,5-octafluoropyrrolidin-1-yl)methyl]-2,3,3,3-tetrafluoro-propanoyl fluoride (460 grams at 80% pure, 0.89 moles) prepared by electrochemical fluorination of methyl 2-methyl-3-pyrrolidin-1-yl-propanoate via a Simons ECF cell of essentially the type described in U.S. Pat. No. 2,713,593 (Brice et al.) and in R.E. Banks, Preparation, Properties and Industrial Applications of Organofluorine Compounds, pages 19-43, Halsted Press, New York (1982) was fed at a rate of 40 ml/hour to a bed of 550 grams (3.98 moles, Sigma-Aldrich) of anhydrous potassium carbonate at 220° C. using the apparatus of Example 1. The crude material collected was fractionally distilled using a 30-tray vacuum jacketed Oldershaw column to provide 138.2 grams (99.0% pure) of a mixture of cis and trans isomers of 2,2,3,3,4,4,5,5-octafluoro-1-[1,2,3,3,3-pentafluoroprop-1-enyl]pyrrolidine. The boiling point is approximately 90° C. The structure was confirmed by gc/ms.

Application Examples

Heat Transfer

Example 1—Viscosity of Preparatory Example 1

Kinematic Viscosity was measured using Schott-Ubbelohde Viscometers (glass capillary viscometers). The viscometers were timed using a Schott model AVS-350 viscometer timer.

The viscometer measurement stand and glass viscometer were immersed in a temperature-controlled liquid bath filled with 3M's Novec 7500 fluid as the bath fluid. The Lawler temperature bath is fitted with a copper tubing coil for liquid nitrogen cooling with fine temperature control provided by the bath's electronic temperature control heater. The fluid is mechanically stirred to provide uniform temperature in the bath. The bath controls temperature ±0.1 deg C., measured by the built-in RTD temperature sensor.

The sample liquid was added to the viscometer between the two fill lines etched on the viscometer. The AVS-350 automatically pumps the sample fluid above the upper timing mark, then releases the fluid and measures the efflux times between the upper and lower timing marks. The fluid meniscus is detected by optical sensors as it passes each timing mark. The sample is drawn up and measured repeatedly, averaging multiple measurements.

The glass viscometers are calibrated using Canon certified kinematic viscosity standard fluids, to obtain a calibration Constant (centistokes per second) for each viscometer.

The measured kinematic viscosity (centistokes) which is the average efflux time (seconds)×constant (centistokes/second) of $(CF_3)_2NCF=CFCF_3$ (Prep Ex 1) is shown in Table 1. This data demonstrates that the material has a wide liquid range which enables its use as a heat transfer fluid.

$$\text{Kinematic Viscosity} = EXP(573.885523 \cdot 1/(T+175) - 3.405055)$$

TABLE 1

| Temp ° C. | Kinematic Viscosity, cS |
|---|---|
| −70.0 | 7.87 |
| −60.0 | 4.85 |
| −50.0 | 3.27 |
| −40.0 | 2.33 |
| −30.0 | 1.73 |
| −20.0 | 1.34 |
| −10.0 | 1.07 |
| 0.0 | 0.91 |
| 25.0 | 0.58 |
| 30.0 | 0.54 |
| 40.0 | 0.48 |
| 50.0 | 0.42 |
| 60.0 | 0.38 |

Example 2: Vapor Pressure of Preparatory Example 1

Vapor Pressure was measured using the stirred-flask ebulliometer method described in ASTM E-1719-97 "Vapor Pressure Measurement by Ebulliometry". This method is also referred to as "Dynamic Reflux". The boiling point was measured using ASTM D 1120-94 "Standard Test Method for Boiling Point of Engine Coolants".

The method uses a 50-mL glass round-bottom flask. Vacuum was measured and controlled using a JKEM vacuum controller. The pressure transducer was calibrated on the day of measurement by comparison with full vacuum and with an electronic barometer located in the same laboratory. The procedure was to begin slowly heating the material, then applying vacuum until boiling occurred and a steady drop wise reflux rate was established. Distillate temperature and pressure reading were recorded, then the vacuum controller was set for a higher absolute pressure and the material was heated further until a new reflux point was established. The pressure level was raised in increments until the vapor pressure curve was obtained up to the atmospheric boiling point. The boiling point and vapor pressures of $(CF_3)_2NCF=CFCF_3$ (Prep Ex 1) are shown in Table 2 below. This vapor pressure data indicate that this material would be useful in a heat transfer application.

TABLE 2

| Vapor Pressure at 68° F.(20° C.) mm Hg | Vapor Pressure at 131° F. (55°) mm Hg | Boiling Point at 760 mm Hg (° C.) |
| --- | --- | --- |
| 50.9 | 266.6 | 85.1 |

Example 3—Thermal Stability Data of Preparatory Example 1

The thermal stability was measured by charged a weighed amount of preparatory example 1 into glass vials and then adding a weighed amount of absorbent. The samples were shaken for 24 hours and then analyzed by GC-MS and GC-FID for breakdown products and purity changes. The thermal stability testing results with various absorbents are shown in Tables 3 and 4. This data indicate that the material would be useful for heat transfer applications because it was stable to various absorbents at elevated temperatures.

TABLE 3

| | Initial Starting Material | Treated with Carbon | Treated with Carbon @ 50° C. | Treated with 4A Mol. Sieve | Treated with 4A Mol. Sieve @ 50° C. |
| --- | --- | --- | --- | --- | --- |
| GC-FID Purity | 99.0% | 99.6% | 99.6% | 99.7% | 99.7% |

TABLE 4

| | Treated with Basic Alumina | Treated with Basic Alumina @ 50° C. | Treated with silica gel | Treated with silica gel @ 50° C. | Treated with activated carbon | Treated with activated carbon @ 50° C. |
| --- | --- | --- | --- | --- | --- | --- |
| GC-FID Purity | 99.7% | 99.7% | 99.2% | 99.5% | 99.5% | 99.6% |

Heat Capacity Measurements:

Examples 4-6 and Comparative Example 1

Specific heat capacity (Cp) of Preparatory Ex 2 (c-O$(C_4F_8)$N—CF=CFCF$_3$), Preparatory Ex. 1(($CF_3)_2$NCF=CFCF$_3$), Preparatory Ex 5 ($C_2F_5$N($CF_3$)—CF=CFCF$_3$) and Novec 7500 ($C_7F_{15}OC_2H_5$) were measured using a TA Instruments Model Q2000 DSC Instrument. (Differential Scanning Calorimeter). Modulated DSC was used, with measurement conditions recommended by TA Instruments for accurate measurement of specific heat capacity. The results are shown in Table 5 below.

TABLE 5

| Temperature ° C. | C-O(C4F8)N—CF=CFCF3 Example 4 Cp J/(g · ° C.) | (CF3)2NCF=CFCF3 Example 5 Cp J/(g · ° C.) | C2F5N(CF3)—CF=CFCF3 Example 6 Cp J/(g · ° C.) | Novec 7500 C.E. 1 Cp J/(g · ° C.) |
| --- | --- | --- | --- | --- |
| 15 | 1.09 | 1.25 | 1.18 | 1.08 |
| 20 | 1.10 | 1.27 | 1.20 | 1.09 |
| 25 | 1.11 | 1.28 | 1.21 | 1.10 |
| 30 | 1.12 | 1.30 | 1.22 | 1.11 |
| 35 | 1.13 | 1.32 | 1.23 | 1.12 |
| 40 | 1.14 | 1.34 | 1.24 | 1.13 |

Foam Blowing Application Examples

Examples 7-13 and Comparative Examples 2-5

In the following examples, the fluorinated nucleating agents were evaluated for reactivity with amine catalysts by forming an emulsion of nucleating agent within a polyol formulation and measuring the concentration of fluoride ion generated over time. A master batch of polyol was prepared containing water, surfactant and catalyst. From this master batch, samples were prepared by emulsifying a mixture of blowing agent and fluorinated nucleating agent into the polyol at their respective concentrations as shown in Table 6. The samples were then examined for generation of fluoride ion, with the initial measurement made immediately after sample preparation and additional measurements made over time as the samples age.

TABLE 6

| Polyol Emulsion Formulation | |
| --- | --- |
| Polyol (KP-990) | 100 g |
| Water | 2.0 g |
| Silicone Surfactant B-8465 | 2.0 g |
| Catalyst (PC-5) | 0.3 g |
| Catalyst (PC-41) | 0.8 g |

TABLE 6-continued

| Polyol Emulsion Formulation | |
| --- | --- |
| Cyclopentane | 16.5 g |
| Nucleating Agent | 2.0 g |

The fluoride ion concentration was determined by diluting 1 g of polyol emulsion with 1 g of isopropanol and adding 0.5 ml of 1N $H_2SO_4$. This was mixed and then further diluted with 1 g of water. 1 ml of this aqueous mixture was combined with 1 ml of TISAB II buffer (Total Ionic Strength Adjustment Buffer) for fluoride measurement using a fluoride specific electrode. Relative mV readings were recorded and converted to F-concentrations (in ppm) from a calibration equation for that electrode. Increasing concentrations of fluoride ion in the polyol emulsions indicate that the fluorinated nucleating agent is unstable in this formulation and is undergoing a reaction in the presence of the polyol and catalysts. The results are displayed in Table 7. These results demonstrate that the compounds of this invention exhibit reduced reactivity with the amine catalysts and are more compatible with the foam formulation.

TABLE 7

Nucleating Agent Stability

| Source Time (hrs) | Example 7 Preparatory example 2 [F−], ppm | Example 8 Preparatory Example 1 [F−], ppm | Example 9 Preparatory example 5 [F−], ppm | C.E. 2 Comp. Ex. FA-188 [F−], ppm | C.E. 3 Comp. Ex. $C_6F_{14}$ [F−], ppm |
|---|---|---|---|---|---|
| 4 | 4 | 5 | 5 | 13 | 0.9 |
| 28 | 9 | 8 | 10 | 89 | 0.5 |
| 54 | 11 | 10 | 9 | 184 | 0.4 |
| 77 | 14 | 11 | 11 | 313 | 0.8 |
| 168 | 19 | 12 | 10 | 691 | 0.5 |

Foams were prepared in examples 10-13 and comparative examples 4 and 5 using the following components:
Polyol 1832 A/2 available from Bayer A G, Leverkusen, Germany.
Voranate M220 Isocyanate available from Dow Belgium B.V.B.A., Edegem, Belgium. Cyclopentane and pentane available from Sigma-Aldrich Corp., St. Louis, Mo., USA.
Silicone surfactant B-8423 available from T. H. Goldschmidt/Evonik Industries AG, Essen, Germany.
FA-188 available from 3M Company, St. Paul, Minn., USA.

Compounds of Preparatory Examples 1, 2 and 5 and FA-188 were emulsified into Polyol 1832 A/2 containing silicone surfactant B-8423 and cyclopentane or pentane using a high shear mixer at 6000 rpm. Voranate M220 isocyanate was then added to this emulsion while mixing at 6000 rpm for 15 seconds. The resulting mixture was poured into a 350 cm×350 cm×60 cm aluminum mold that was preheated to 50° C. The cell size foams were evaluated perpendicular to the foam rise direction. The ranges of cell size diameters described in the examples were designated as follows:

| Very Fine | 70-100 micrometers |
| Fine | 100-150 micrometers |
| Medium | 150-200 micrometers |
| Large | 200-300 micrometers |
| Very Large | >300 micrometers |

TABLE 8

| | Example 10 | Example 11 | Example 12 | Example 13 | Comp Ex 4 | Comp Ex 5 |
|---|---|---|---|---|---|---|
| Polyol 1832 A/2 | 122 | 122 | 122 | 122 | 122 | 122 |
| Voranate M220 Isocyanate | 199 | 199 | 199 | 199 | 199 | 199 |
| Cyclopentane | 15 | 15 | 15 | — | 15 | 15 |
| Silicone B-8423 | 3.5 | 3.5 | 3.5 | 3.5 | 3.5 | 3.5 |
| Pentane | — | — | — | 15 | — | — |
| FA-188 | — | — | — | — | 3.5 | — |
| Preparatory Example 1 | 3.5 | — | — | 3.5 | — | — |
| Preparatory Example 2 | — | 3.5 | — | — | — | — |
| Preparatory Example 5 | — | — | 3.5 | — | — | — |
| Density | 25.2 | 25.8 | 25.7 | 24.9 | 25.4 | 25.6 |
| Average Cell Size | Fine | Fine | Fine | Fine | Fine | Medium |

Dielectric Application

Example 14

The dielectric constant (tested per ASTM D 150) and the dielectric breakdown strength (tested per ASTM D877) of Preparatory Example 2 (c-O($C_4F_8$)N—CF=$CFCF_3$) were measured.

The dielectric constant measured at 1 kHz was 1.87. The dielectric breakdown voltage measured using disk electrodes with 2.5 mm gap is 43.7 kV was 3000 V/s.

Organic Rankine Cycle Application

Example 15 and Comparative Examples 6 and 7

Organic Rankine Cycle calculations were done using preparatory example 2. The critical temperature and pressure of preparatory example 2 was determined from the molecular structure using the method of Wilson-Jasperson given in Reid, Prausnitz and Poling, *The Properties of Gases and Liquids,* $5^{th}$ ed., McGraw-Hill, 2000. The critical density was calculated using the method of Joback given in Reid, Prausnitz and Poling, *The Properties of Gases and Liquids,* $5^{th}$ edition, McGraw-Hill, 2000. Thermodynamic properties were derived using the Peng-Robinsion equation of state (Peng, D. Y., and Robinson, D. B., *Ind. & Eng. Chem. Fund.* 15: 59-64, 1976), with an applied shift for liquid density/volume to match known density at $0.7*T_r$, where $T_r$ is the reduced temperature. Inputs required for the equation of state were critical temperature, critical density, critical pressure, acentric factor, molecular weight and ideal gas heat capacity. Ideal gas heat capacity was calculated using a group contribution method (Rihani, D., Doraiswamy, L., Ind. & Eng. Chem. Fund., 4, 17, 1965). The acentric factor was calculated from a correlation of measured vapor pressure data.

A similar method to the above was used to derive the thermodynamic properties for comparative example 6 (Novec 7200, available from 3M Company, St Paul, Minn.), with the exception that critical properties (temperature, pressure and density) were measured.

For comparative example 7 (Novec 774, available from 3M Company, St Paul, Minn.), thermophysical property data were fitted to a Helmholtz equation of state, with the functional form described in Lemmon E. W., Mclinden M. O., and Wagner W., J. Chem. & Eng. Data, 54: 3141-3180, 2009.

Figure 3:
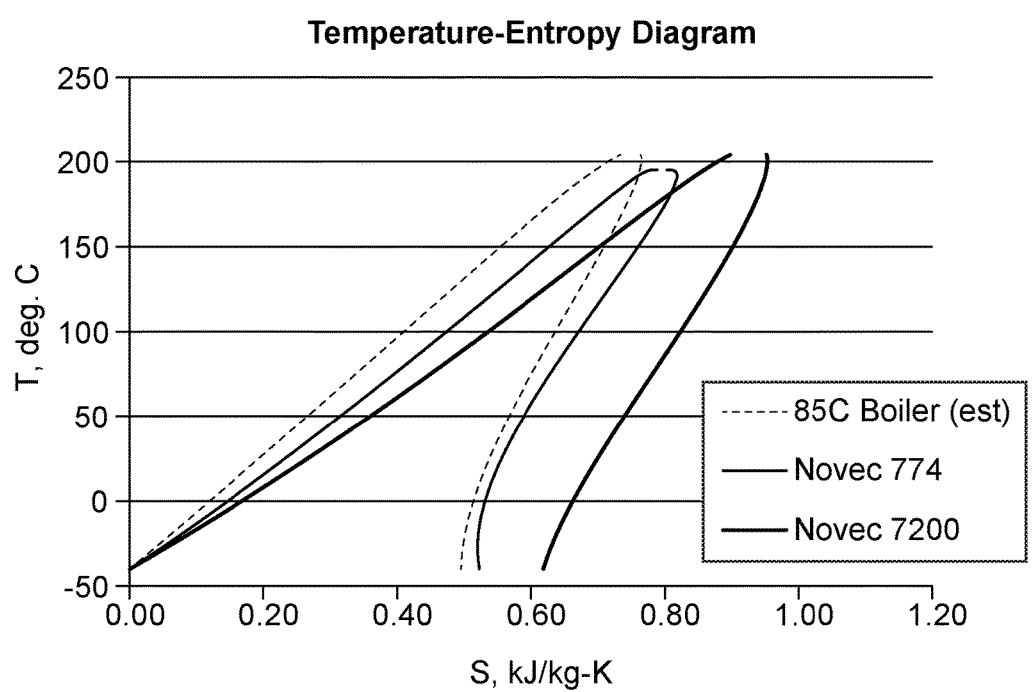
FIG. 3 is a temperature-entropy plot for fluids in accordance with some embodiments of the present disclosure.

Temperature-Entropy plots, shown in FIG. 3, were generated using the equations of state described above for each fluid. A simple Rankine cycle operating between 80° C. and 200° C., was used to assess the performance of the fluids. The Rankine cycle was modeled using the calculated thermodynamic properties from the equations of state and the procedure described in Cengel Y. A. and Boles M. A., *Thermodynamics. An Engineering Approach, 5th Edition*; McGraw Hill, 2006. The heat input for the cycle was 1000 kW, with working fluid pump and expander efficiencies assumed to be 100%.

Coating Application Deposition Solvent

Examples 16-18

Solubility Testing

Compounds from Preparatory Examples 1, 2 and 5 were evaluated for utility as deposition solvents based upon solubility for three industrial lubricants (Z-Dol 2500 and Fomblin Z-Tetraol S Grade available from Solvay SA, Brussels, Belgium and Moresco D40H available from Moresco, Kobe-City, Hyogo, Japan). A disposable glass vial was placed on a four-place balance and the mass (My) recorded. The balance with the glass vial was tared and deposition solvent was added (varying from 1 g to 5 g) and the mass (Ms) was recorded. The balance with the deposition solvent in the glass vial was tared again. The lubricant was added in a dropwise fashion using a disposable plastic pipette and the mass (ML) recorded. The glass vial was then mixed by hand for 10 seconds to 30 seconds and the solution clarity was visually observed and recorded. If the solution was hazy, the lubricant was considered to have exceeded the solubility limit of the deposition solvent. If the solution was clear, additional drops of lubricant were added to the glass vial, the mass (ML) was recorded, the glass vial was shaken, and the solution clarity was observed. This process was continued until a hazy solution was observed or more than 10% w/w (weight of lubricant to combined weight of lubricant and deposition solvent) was reached. After a hazy solution or more than 10% w/w was reached, the glass vial with the solution was removed from the balance. The balance was tared and the final mass (Mp) of the glass vial with deposition solvent and lubricant was measured and recorded. To account for the evaporative losses of the deposition solvent during the experiment, the mass of the vial and the mass of the lubricant added were subtracted from the total mass of the vial with the deposition solvent and lubricant to determine the final mass of deposition solvent (Ms*) in the vial (i.e., Ms*=MF−My−ML). Solubility of the lubricant in deposition solvents was calculated as (ML+Ms*) and reported in % w/w (weight/weight).

The lubricants described above were mixed with deposition solvents and the solubility results are shown in Table 8 compared to Novec 7100 fluid available from 3M Company, St. Paul, Minn., USA. If the endpoint was not clearly observed, the solubility experiment was repeated. Where a range is reported for solubility, the lower number is the highest soluble value and the higher number is the lowest insoluble value.

| | Solvent | Z-Dol 2500 | Z-Tetraol S Grade | Moresco D40H |
|---|---|---|---|---|
| Example 16 | Preparatory Example 5 | >10% | <<1% | ~0.25% |
| Example 17 | Preparatory Example 2 | >10% | 0.67-0.98% | 0.67-0.98% |
| Example 18 | Preparatory Example 1 | >10% | <<1% | 0.25-0.33% |
| Comparative Example 8 | Novec 7100 | >10% | 0.3-0.4% | ~0.5% |

Example 19

Cleaning Application

The compounds from the preparatory examples 2 and 5 can be used alone or in combination with surfactants or co-solvents to clean a contaminated substrate by immersing the substrate in the compound, removing the substrate from the compound, removing adhering liquid and drying the parts.

Clean Extinguishing Agent Application

Example 20

The Micro-Cup Burner Test is a laboratory test that measures the extinguishing ability of an agent based upon the quantity of agent required to extinguish a fire under the following test conditions. The Micro-Cup Burner Test utilizes a quartz concentric-tube laminar-diffusion flame burner aligned vertically with fuel and air/agent flows directed upward. A fuel, typically propane unless otherwise specified, flows at 10.0 sccm (standard cubic centimeters per minute) through a 5-mm I.D. inner quartz tube which is centered in a 15-mm I.D. quartz chimney. The chimney extends 4.5 cm above the inner tube. Air flows through the annular region between the inner tube and the chimney at 1000 sccm. Prior to the addition of extinguishing composition, a visually stable flame is supported on top of the inner tube, and the resulting combustion products flow out through the chimney. An extinguishing composition to be evaluated is introduced into the air upstream of the burner. Liquid compositions of the invention are introduced by a syringe pump and are volatilized in a heated vessel. The fuel is ignited to produce a flame and is allowed to burn for 90 seconds. After 90 seconds, a specific flow rate of composition is introduced, and the time required for the flame to be extinguished is recorded. The fire extinguishing compositions of the invention are recorded as volume % of extinguishing composition in air required to extinguish the flame within an average time of 30 seconds or less.

Other embodiments of the invention are within the scope of the appended claims.

What is claimed is:

1. A foamable composition comprising:
    a blowing agent;
    a foamable polymer or a precursor composition thereof; and
    a nucleating agent, wherein said nucleating agent comprises a compound represented by the following general formula (I):

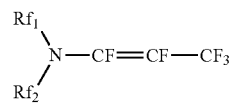

wherein (i) $Rf_1$ and $Rf_2$ are independently linear or branched perfluoroalkyl groups having with 1-4 carbon atoms and optionally comprise at least one catenated heteroatom, or (ii) $Rf_1$ and $Rf_2$ are bonded together to form a ring structure having 4-6 carbon atoms and optionally comprise one or more catenated heteroatoms;

with the proviso that if $Rf_1$ and $Rf_2$ are bonded together to form a ring structure comprising a nitrogen heteroatom, said nitrogen heteroatom is tertiary and is bonded to a perfluoroalkyl group having 1-3 carbon atoms.

2. A foamable composition according to claim 1, wherein the nucleating agent and the blowing agent are in a molar ratio of less than 1:2.

3. A foamable composition according to claim 1, wherein the blowing agent comprises an aliphatic hydrocarbon having from about 5 to about 7 carbon atoms, a cycloaliphatic hydrocarbon having from about 5 to about 7 carbon atoms, a hydrocarbon ester, water, or combinations thereof.

* * * * *